(12) United States Patent
Teshima et al.

(10) Patent No.: US 7,214,351 B2
(45) Date of Patent: May 8, 2007

(54) CATALYTIC COMBUSTION REACTOR WITH A HEAT EXCHANGER TUBE BUNDLE HOUSED THEREIN, CATALYTIC STRUCTURE AND METHOD FOR CARRYING OUT CATALYTIC COMBUSTION-REACTION USING THE REACTOR AND THE CATALYTIC STRUCTURE

(75) Inventors: Yutaka Teshima, Yamaguchi-ken (JP); Shunji Inoue, Yamaguchi-ken (JP); Yasuhiro Kojima, Yamaguchi-ken (JP)

(73) Assignee: Tosoh Corporation, Shinnanyo-shi (JP)

( * ) Notice: Subject to any disclaimer, the term of this patent is extended or adjusted under 35 U.S.C. 154(b) by 580 days.

(21) Appl. No.: 10/397,171

(22) Filed: Mar. 27, 2003

(65) Prior Publication Data

US 2003/0213236 A1    Nov. 20, 2003

(30) Foreign Application Priority Data

Mar. 29, 2002  (JP) .............................. 2002-095048
Mar. 29, 2002  (JP) .............................. 2002-095049

(51) Int. Cl.
*B01D 50/00*   (2006.01)

(52) U.S. Cl. ..................................... 422/177
(58) Field of Classification Search ............... 422/168, 422/218, 181, 177
See application file for complete search history.

(56) References Cited

U.S. PATENT DOCUMENTS 3,251,656 A   5/1966   Edwards
5,466,421 A   11/1995  Deller et al.
5,593,645 A   1/1997   Steenackers et al.

(Continued)

FOREIGN PATENT DOCUMENTS

DE          820894       * 11/1951

(Continued)

OTHER PUBLICATIONS

Kagaku Kohgaku Binran, 5th revised Edition, p. 1118.

*Primary Examiner*—Glenn Caldarola
*Assistant Examiner*—Tom P. Duong
(74) *Attorney, Agent, or Firm*—Oblon, Spivak, McClelland, Maier & Neustadt, P.C.

(57) ABSTRACT

A catalytic combustion reactor system comprises a heat exchange unit that comprises a bundle of open-ended tubes, the bundle having first and second collective ends, the first collective end adjoining a catalytic reactor that comprises a plurality of catalyst containing housings each of which is provided with an opening for the inflow of fluid for combustion and an opening for the outflow of fluid combustion product;

an outer shell that envelopes the adjoined heat exchange unit and catalytic reactor and permits the flow of fluid to contact the heat exchange tube surfaces to absorb heat generated by the combustion reaction and to enter the inlet openings of the catalyst containing housings, the shell having a single fluid inlet in the area of the second collective end of the heat exchange unit, thereby allowing contact of the entire length of the tubes of the bundle with the incoming fluid for the exchange of heat; and a single outlet at the second collective end of the heat exchange unit which collects combustion fluid that is discharged from the outlet of said fluid combustion product and which traverses the length of each heat exchange tube.

2 Claims, 7 Drawing Sheets

U.S. PATENT DOCUMENTS

5,809,776 A     9/1998   Holtermann et al.
6,221,320 B1*   4/2001   Nagaoka .................... 422/218

FOREIGN PATENT DOCUMENTS

| FR | 1 409 120 |   | 8/1965 |
| GB | 1065044   | * | 4/1967 |
| JP | 51-7245   |   | 3/1976 |
| JP | 56-97525  |   | 8/1981 |
| JP | 5-39912   |   | 2/1993 |
| JP | 6-30415   |   | 4/1994 |
| JP | 10-156142 |   | 6/1998 |

* cited by examiner

CATALYTIC COMBUSTION REACTOR WITH A HEAT EXCHANGER TUBE BUNDLE HOUSED THEREIN, CATALYTIC STRUCTURE AND METHOD FOR CARRYING OUT CATALYTIC COMBUSTION-REACTION USING THE REACTOR AND THE CATALYTIC STRUCTURE

BACKGROUND OF THE INVENTION

1. Field of the Invention

The present invention relates to a catalytic combustion reactor and a catalytic structure, each of which, when a gas is subjected to catalytic combustion reaction, effectively recovers thermal energy generated by the catalytic combustion reaction under an atmosphere having a high temperature or having a high temperature and a corrosive property, and each of which is particularly adequate for oxidation reaction of hydrocarbon and/or halogenated hydrocarbon, and a method for carrying out catalytic combustion reaction by using the catalytic combustion reactor and the catalytic structure.

2. Description of the Background

Catalytic combustion reactors are broadly classified into a fixed bed type, a fluidized bed type and a moving bed type in terms of shape. Among them, fixed bed catalytic combustion reactors have been widely adopted in the chemical industry. As described on page 1118 of "Kagaku Kohgaku Binran, 5th revised edition", the fixed bed catalytic combustion reactors are further classified into a) a thermal insulation type, b) a multi-stage and thermal insulation type with heat exchange made in an intermediate step, c) a multi-stage and thermal insulation type with a raw material supplied in an intermediate step, d) an autothermal type, e) a multi-tube heat exchange type and f) a direct heating type in terms of heating methods. The heating method is selected, depending on the magnitude of heat generated by the reaction.

In general, when oxidation reaction is carried out in a fixed bed catalytic reactor, a method for using a heat exchanger to carry out heat exchange between a fluid flowing into and a fluid flowing out of a thermal insulation type reactor in addition to the autothermal type among the classified types is adopted as a method for recovering the reaction heat since the fluid that has passed through the catalytic bed is heated to a high temperature by the reaction heat.

When reaction accompanied by the creation of a corrosive gas, such as oxidation reaction of halogenated hydrocarbon, is carried out, a gas having a high temperature and a corrosive property is created. When the reactor is made of a metallic material in such a case, the portion of the reactor in contact with that sort of fluid needs to be made of a so-called quality material having a superior corrosive-resistant property, such as an Fe-based alloy containing high Ni and high Cr, or a Ni-based heat-resistant and corrosion-resistant alloy containing Cr.

The fixed bed catalytic reactor needs to have a catalytic structure located therein so as to equally increase the throughput of a fluid per unit catalyst amount, or a so-called space velocity, improving catalytic efficiency and equalizing the lifetime of catalysts. Additionally, the catalytic structure needs to be located so as to minimize the pressure loss in the catalysts per se in order to provide smooth communication of a fluid to be subjected to combustion reaction.

JP-A-10-156142 discloses a catalytic purifier, which purifies air containing a toxic gas to obtain clean air having a high temperature by using a catalytic combustion reactor to burn and purify the toxic gas contained in the air to be purified, and which includes at least a heat exchanger for preheating the air to be purified with purified air having a high temperature, a preheater used on start-up, a feed device for a combustible material, and a catalytic combustion reactor so as to flow the air to be purified through the devices in this order. In the purifier of JP-A-10-156142, the reactor main body and the external communicating pipe for introducing the purified gas having a high temperature to the heat exchanger are configured to be exposed to the purified gas having a high temperature after combustion reaction.

Figure 2:
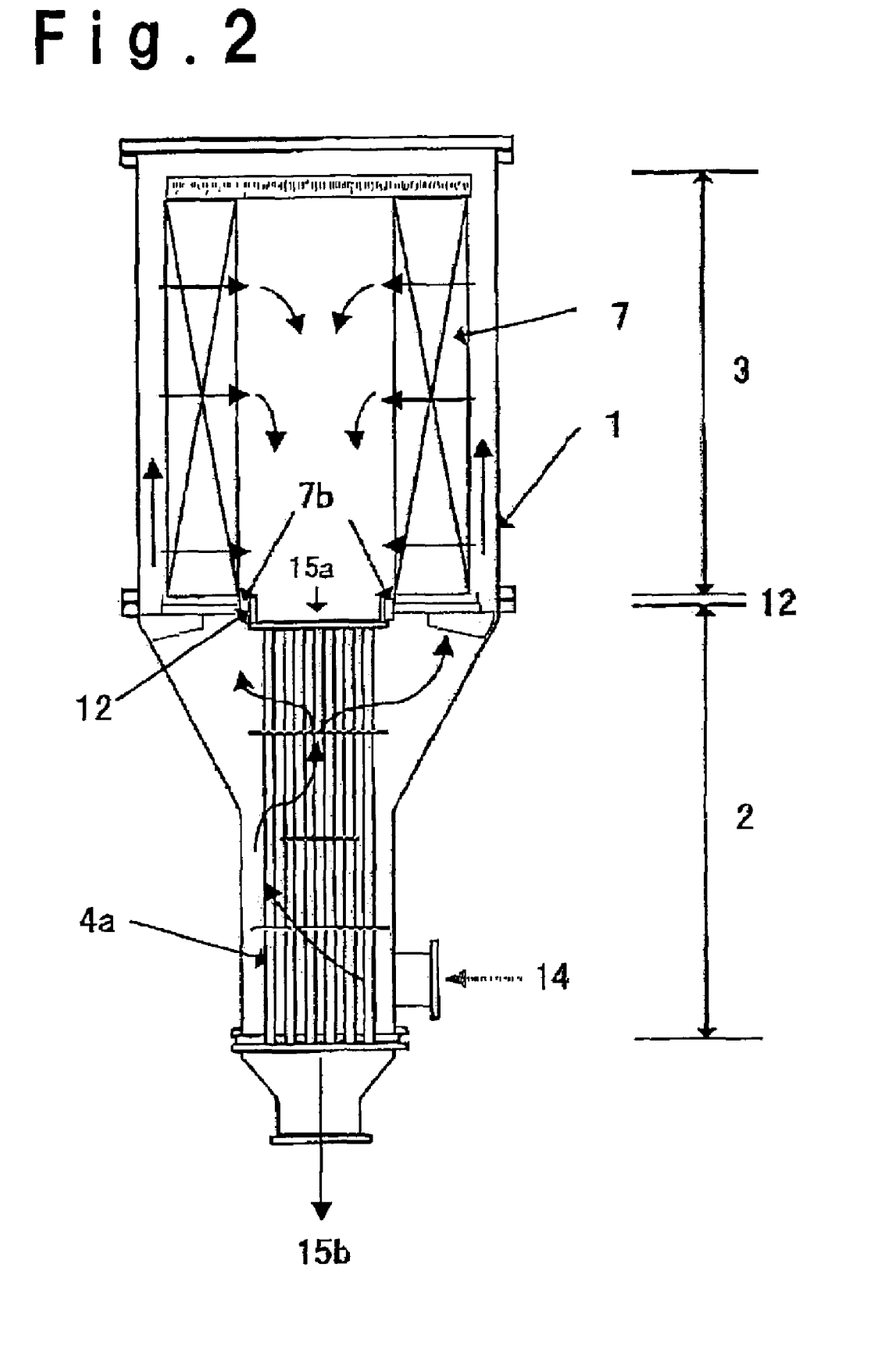
FIG. 2 is a schematic view showing how a fluid flows in a reaction method using the catalytic combustion reactor.

U.S. Pat. No. 5,466,421 discloses an exhaust gas purifier, which comprises a cylindrical reactor casing, a heat exchanger, a pipe for introducing an exhaust gas to be treated into the heat exchanger, and a pipe for discharging the treated exhaust gas from the casing, wherein the heat exchanger includes a first branch pipe and a second branch pipe having a limitation to thermal contact. The purifier of U.S. Pat. No. 5,466,421 is configured so that an outermost portion of the reactor main body is exposed to the purified gas having a high temperature between the outlet of a catalyst bed and a housed tube bundle as shown in FIG. 2.

Although each of the catalytic reactors disclosed in those prior art references preheats a fluid to be treated by use of a purified gas having a high temperature after combustion reaction in the heat exchange associated with the reactor, no consideration is given to thermal energy loss due to heat radiation, which is created by the contact of the outer shell with the reactor main body and the pipe passing the purified gas having a high temperature therethrough, and no consideration is given to a decrease in the area of a portion in contact with a fluid having a high temperature or having a high temperature and a corrosive property.

Although JP-B-51-7245 discloses a catalytic purifier, which provides a catalyst in slant fashion therein in order to increase the contact surface to raise catalytic efficiency, no consideration is given to the recovery of reaction heat as a preheating source for a fluid to be treated or a decrease in the area of a portion in contact with a fluid having a high temperature or having a high temperature and a corrosive property.

Although JP-A-56-97525 discloses a contact oxidation system for a contaminant in an exhaust gas, which is characterized to comprise a treatment chamber including a gas-permeable catalyst bed including a first catalyst layer and a second catalyst layer containing at least one kind of noble metal, no consideration is given to the arrangement for increasing catalytic efficiency. No consideration is given to the recovery of reaction heat as a preheating source for a fluid to be treated or a decrease in the area of a portion in contact with a fluid having a high temperature or having a high temperature and a corrosive property.

JP-A-5-39912 discloses a deodorizing system, which burns a fluid to be treated containing a harmful component, such as a malodorous substance, or dust and dirt, and kills germs in the fluid to be treated, and which comprises a heat exchanger for preheating the fluid to be treated by purified air having a high temperature, a burner for throwing flame into a combustion chamber, and a porous ceramic plate for directing an untreated gas in zigzag fashion in an atmosphere having a high temperature in the combustion chamber to sufficiently provide the untreated gas with radiant heat. In the reactor of JP-A-5-39912, a direct burning system without using a catalyst is adopted. No consideration is given to the improvement in maintenance by independently providing the combustion chamber and the tube bundle.

Although JP-U-6-30415 discloses a catalytic system for purifying an exhaust gas from a diesel engine, wherein a fluid to be treated is passed from the inside of a cylindrical catalyst or two rectangular catalysts to outside or vice versa to decrease the amount of soot adhering to the cylindrical catalyst or the rectangular catalysts, no consideration is given to the location of the catalyst or catalysts for increasing catalytic efficiency. No consideration is given to the recovery of reaction heat as a preheating source for the fluid to be treated or a decrease in the area of a portion in contact with a fluid having a high temperature or having a high temperature and a corrosive property.

SUMMARY OF THE INVENTION

It has been desired to develop a catalytic combustion reactor, a catalytic structure and a method for carrying out catalytic combustion by using the catalytic combustion reactor and the catalytic structure, wherein catalytic combustion reaction is carried out in the reactor housing a catalyst so as to equalize and maximize catalytic efficiency, the thermal energy generated in the catalytic combustion reaction is recovered with thermal energy loss due to heat radiation to outside minimized, and the necessary amount of a quality material having a heat-resistant property or having a heat-resistant property and a corrosion-resistant property can be made as small as possible by minimizing the area of a portion of the catalytic combustion reactor, which is exposed to a fluid having a high temperature or having a high temperature and a corrosive property after combustion reaction.

The inventors have dedicated to make research and development on a solution to the problem and attained the present invention.

According to a first aspect of the present invention, there is provided a catalytic combustion reactor comprising a heat exchanger unit and a catalytic structure unit, which are formed so as to have an integral outer shell; the heat exchanger unit housing a tube bundle, which includes a heat exchanger tube and tube plates provided at both ends of the heat exchanger tube; the catalytic structure unit housing a catalytic structure including openings, which, respectively, work as an inflow surface for a fluid to be subjected to combustion reaction and an outflow surface for the fluid after combustion reaction; the tube bundle unit and the catalytic structure being coupled such that one of the tube plates communicates with one of the openings of the catalytic structure at a connection portion in the reactor, and the outer shell being formed in such a shape to surround the tube bundle and the catalytic structure so as to ensure a communication passage between the heat exchanger unit and the other opening of the catalytic structure.

According to a second aspect of the present invention, there is provided a catalytic structure comprising four catalytic members, each of which has two openings, respectively, working as an inflow surface for a fluid to be subjected to combustion reaction and an outflow surface for the fluid after combustion reaction, and one of the openings of each of the catalytic members being provided so as to be located at a lateral side of a rectangular parallelepiped.

According to a third aspect of the present invention, there is provided a method for carrying out catalytic combustion by using the reactor and catalytic structure, comprising passing a fluid as a gas to be subjected to combustion reaction outside the heat exchanger tube in the heat exchanger unit; introducing the fluid into the catalytic structure through the communicating passage to carry out combustion reaction; taking the fluid after combustion reaction out of one of openings of the catalytic structure; introducing the fluid after combustion reaction into the heat exchanger tube through the connection portion in the reactor; subjecting the introduced fluid to heat exchange with a fluid as a gas to be subjected; and discharging the fluid after combustion reaction out of the reactor.

DETAILED DESCRIPTION OF THE PREFERRED EMBODIMENTS

In accordance with the present invention, it is possible to decrease the area of a portion of the catalytic reactor in contact with a fluid after combustion reaction and to extremely decrease the necessary amount of a quality material having a heat-resistant property and a corrosive-resistant property even under an atmosphere having a high temperature of 400° C. or higher, or having a high temperature and a corrosive property, which is created by catalytic combustion reaction. As a result, it is possible to fabricate the main body of the reactor, in particular a large area of the outermost portion of the reactor, from carbon steel or stainless steel commonly used.

Additionally, it is possible to significantly decrease so-called thermal energy loss due to heat radiation by minimizing the area of the outermost portion in direct contact with a fluid after combustion reaction having a high temperature after catalytic combustion.

Further, the tube bundle and the catalytic structure may be firmly supported by respective independent supporters so as to be detachable at the connection portion, disassembling, respectively, the catalyst structure, the heat exchanger tube and the tube plates at both ends of the heat exchanger for inspection. In this case, it is extremely easy to carry out maintenance and repair, such as inspection or cleaning, required for maintaining the performance of the catalytic combustion reactor.

In the drawings:

FIGS. 1(a) and 1(b) are schematic views of the catalytic combustion reactor according to an embodiment of the present invention, wherein FIG. 1(a) is a cross-sectional view taken along line A-A' of FIG. 1(b);

Now, embodiments of the present invention will be described in detail, referring to FIGS. 1(a) to 6(b).

Figure 1A:
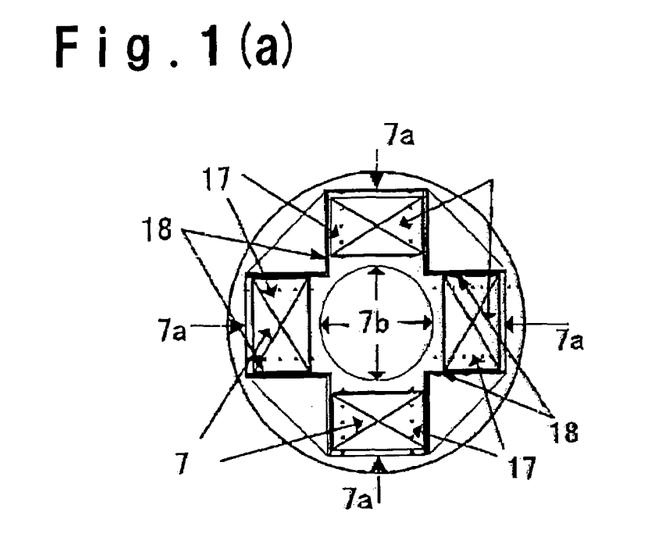
Figure 1B:
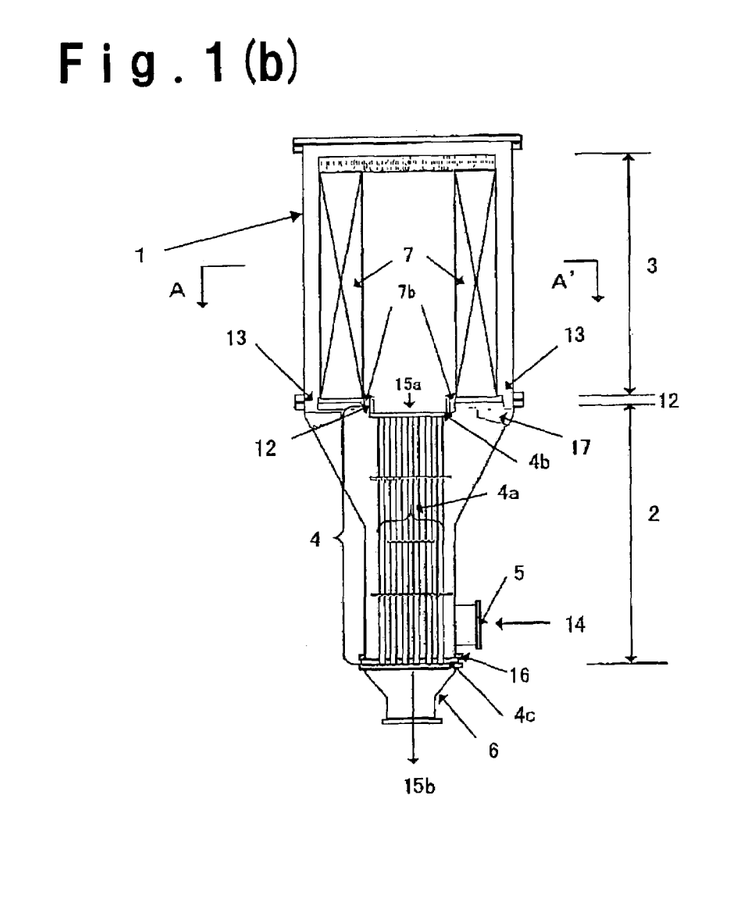

As shown in FIGS. 1a and 1b, the catalytic combustion reactor 1 according to the present invention basically comprises a heat exchanger unit 2 and a catalytic structure unit 3.

The heat exchanger unit 2 houses a tube bundle 4, which includes a heat exchanger tube 4a and tube plates 4b, 4c provided at both ends of the heat exchanger tube. Each of the tube plates 4b, 4c has a hole formed therein for fluid passage through the heat exchanger tube 4a. The heat exchanger tube has both ends connected to the holes of the tube plates. Although there is no limitation to the shape of the heat exchanger tube 4a as long as the heat exchanger tube allows a fluid to flow therethrough, a linear and circular tube is normally used. The heat exchanger tube comprises a single passage or a plurality of passages may be used.

The catalytic structure unit 3 houses a catalytic structure 7 and includes openings, which, respectively, work as an inflow surface for a fluid to be subjected to combustion reaction 14 and an outflow surface for a fluid after combustion reaction 15a. The catalytic structure has one opening 7b provided so as to connect with one of the tube plates of the tube bundle.

The catalytic combustion reactor 1 has an outer shell formed so as to surround the tube bundle 4 of the heat exchanger and the catalytic structure 7. The catalytic combustion reactor has a structure to ensure a communication passage 13 for the fluid to be subjected to combustion reaction, which extends from the heat exchanger unit 2 to the other opening 7a of the catalytic structure 7.

The outer shell of the catalytic combustion reactor is provided with an inlet 5 for the fluid to be subjected to combustion reaction 14 at a position of the heat exchanger unit, and the tube plate 4c of the heat exchanger is provided with an outlet 6 for the fluid after combustion reaction 15b.

The fluid to be subjected to catalytic combustion reaction 14 is first introduced to an outer periphery of the heat exchanger tube 4a of the tube bundle 4 through the inlet 5. While the fluid to be subjected to catalytic combustion reaction is passing through the heat exchanger unit 2, the fluid to be subjected to catalytic combustion reaction is preheated by the fluid after combustion reaction 15a, which has a high temperature and is passing through the heat exchange tube 4a. Then, the fluid to be subjected to catalytic combustion reaction is introduced into the catalytic structure unit 3 through the communication passages 13.

In the catalytic structure unit 3, the preheated fluid to be subjected to combustion reaction 14 is introduced into the catalytic structure 7 through the other opening 7a and undergoes so-called catalytic combustion during passing through the catalytic structure unit.

The fluid after catalytic combustion 15a passes through a connection portion 12 between the one opening 7b of the catalytic structure and the tube plate 4b close to the catalytic structure, is introduced into the inside of the heat exchanger tube 4a, is cooled during being subjected to heat recovery, by preheating the fluid to be subjected to catalytic combustion reaction 14 through a tube wall and is discharged outside of the catalytic combustion reactor 1 through the outlet 6.

The catalytic structure 7 is made of a catalytic bed portion, which may comprise a catalyst and a holder therefor.

With respect to a catalyst used in the catalytic member according to the present invention, there is no limitation in terms of the kind of the combustion catalyst. The catalyst comprises a carrier and an active component, which are prepared by a conventional method commonly used. Examples of the active component are platinum, iridium, palladium, ruthenium, copper oxide and manganese oxide. Examples of the carrier are alumina, silica, zeolite, boehmite and silica-alumina. As the method for incorporating the active component in the carrier, an impregnation method, an immersion method, a spray-impregnation method, an ion exchange method or another conventional method is applicable.

A holder for the catalyst may have any shapes. There is no limitation to the shape of the holder as long as the holder can have a catalyst filled thereinto or carried thereon. There is no limitation in terms of the shape of the holder as long as the holder has a structure to prevent the shape of the catalytic structure from significantly changing during reaction. Examples of the holder are a cylindrical metallic member, a metal box and a frame with a metallic net, each of which includes the inlet for the fluid to be subjected to combustion reaction and the outlet for the fluid after combustion reaction. The selection is made according to the shape of the catalyst used in the reactor. The catalytic structure is formed by filling the holder with the catalyst formed in a granular shape, a pellet shape, a spherical shape, a tablet shape, an extrusion shape or the like. In a case wherein it is preferable to decrease the pressure loss that is created when the fluid to be subjected to combustion reaction passes through the catalytic structure, it is particularly effective to use a honeycomb catalyst wherein a catalyst is carried on a honeycomb body made of ceramics or the like. In a case wherein a catalyst per se has strength enough to stand independently, the catalyst may have a comparatively simple structure as long as consideration is given to prevent the catalyst from falling down.

At the connection portion 12 in the reactor, the tube bundle 4 of the heat exchanger and the catalytic structure 7 are coupled together through one of the tube plates 4b and the one opening 7b of the catalytic structure, which is the opening working as the outflow surface for the fluid after combustion reaction in the catalytic structure unit. The other tube plate 4c is connected to the outlet for the fluid after combustion reaction 15b.

Noteworthy is that the connection portion 12 connecting between the inside of the heat exchanger tube 4a and the one opening 7b of the catalytic structure 7 is located in an extremely limited position in the catalytic combustion reactor 1 and is not directly contacted with an outermost portion of the main body of the catalytic combustion reactor 1.

When catalytic combustion reaction is carried out, the fluid after combustion reaction generally has a temperature of 400° C. or higher by exothermal reaction. When the fluid for catalytic combustion reaction contains halogenated hydrocarbon, corrosion, which causes a significant problem in the reactor, should be taken into account since the fluid after combustion reaction contains moisture and hydrogen halide, generated by the combustion reaction of halogenated hydrocarbon, as a mixture is mixed into the fluid after combustion reaction. In order to cope with this problem, it is necessary to use an expensive material that is resistant to high temperatures and also to corrosion as needed, such as an Fe-based alloy containing high Ni and high Cr, or a Ni-based heat-resistant and corrosion-resistant alloy containing Cr.

When the catalytic combustion reactor 1 according to the present invention is used to carry out catalytic combustion reaction in the fluid to be subjected to combustion reaction 14, the fluid after combustion reaction 15a, which has flowed out of the one opening 7b of the catalytic structure, is introduced from the connection portion 12 in the reactor directly into the heat exchanger unit 2 and is cooled therein as shown in FIG. 2. By this arrangement, portions in contact with a fluid having a high temperature or a fluid having a high temperature and a corrosive property can be limited to an extremely small area, minimizing the areas of portions to be made of an expensive material. Which expensive material to be used is determined in terms of heat-resistance and corrosion resistance, depending on the property and the composition of the fluid after catalytic combustion. When the fluid after catalytic combustion has no corrosive property, stainless steel is used for a temperature of 400° C. or higher. When the fluid after catalytic combustion has a high temperature and a corrosive property, a more expensive material, such as an Fe-based alloy containing high Ni and high Cr, or a Ni-based heat-resistant and corrosion-resistant alloy containing Cr, is applicable.

When the catalytic combustion reactor is fabricated from any one of those metallic materials, the advantages of the present invention can be offered in the best fashion up to a temperature 700° C. or lower since any one of those metallic materials can have required strength under such a high temperature. Any materials having acceptable heat-resistance and corrosion-resistance are applicable.

Advantageously, the catalytic combustion reactor 1 has such a structure that the fluid after combustion reaction 15a, which has a high temperature, flows in an inner portion, and that the fluid to be subjected to catalytic combustion reaction 14, which has a relatively low temperature before catalytic combustion, flows in an area surrounding the inner portion. Accordingly, the main body of the catalytic combustion reactor 1 may be made of a common metallic material, such as carbon steel or stainless steel. Additionally, the main body of the catalytic combustion reactor 1 may reduce the necessary amount of a heat insulating material required for suppressing heat radiation from the outermost portion of the main body. Further, the reactor can significantly decrease heat radiation loss.

Although there is no limitation to the structure of the connection portion 12, it is preferable that the connection portion is formed so as to be detachable by use of a flange structure, an insertion structure of the heat exchanger or the like. When there is a fear that a so-called shortcut is formed and allows part of the fluid to bypass a regular path in the connection portion 12, it is necessary to prevent the bypass, which can be coped with by use of a known seal structure like a gland packing.

When the catalytic structure 7 and the tube bundle 4 are independently firmly supported by a first supporter 17 for the catalytic structure and a second supporter 16 for the tube bundle in the reactor 1, it is advantageously possible to extremely easily and effectively carry out an operation for the heat exchanger 2, such as replacement or cleaning of heat exchanger tubes 4a, or catalyst replacement, which is needed, e.g., because of a degradation in the activity of the catalyst.

Figure 3A:
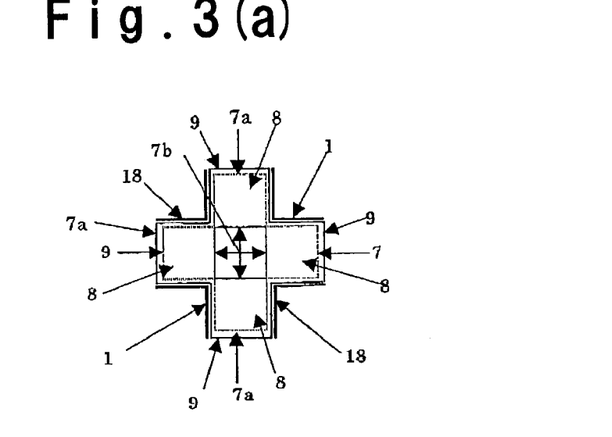
FIGS. 3(a), 3(b) and 3(c) are schematic views of the catalytic structure according to an embodiment of the present invention.
Figure 3B:
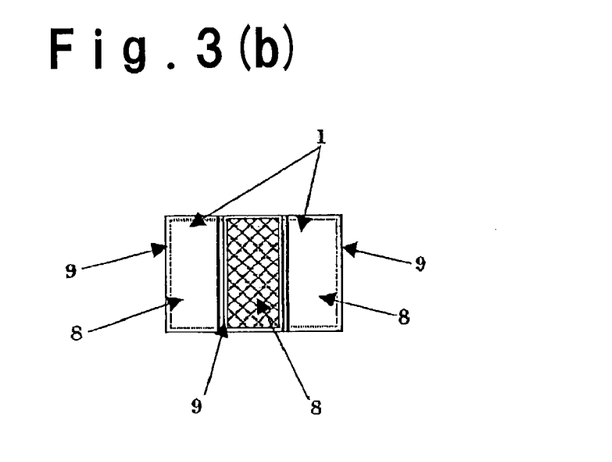
Figure 3C:
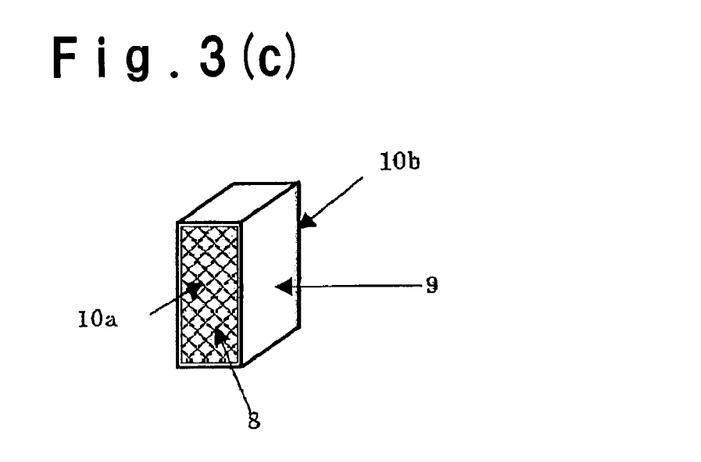
Figure 4A:
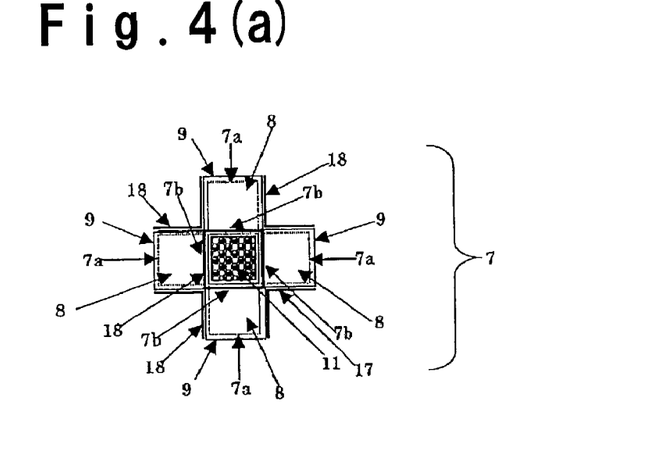
FIGS. 4(a), 4(b) and 4(c) are schematic views of the catalytic structure according to another embodiment of the present invention.
Figure 4B:
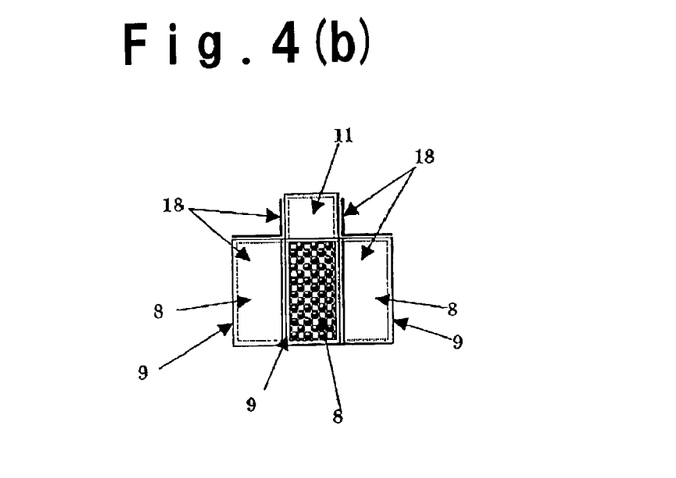
Figure 4C:
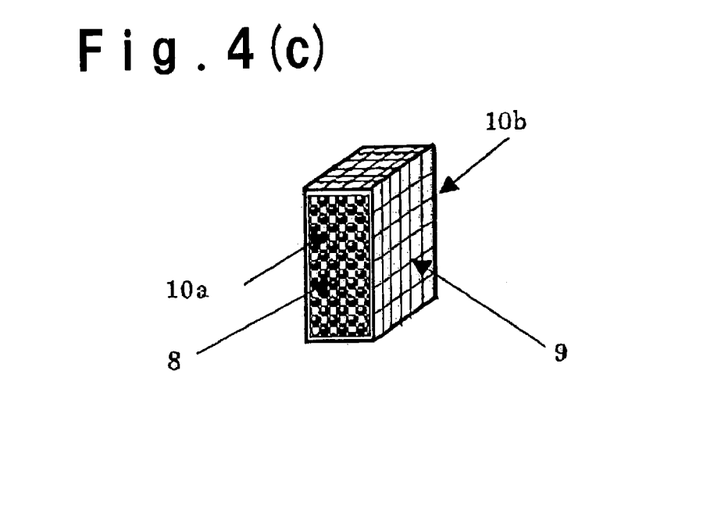
Figure 5A:
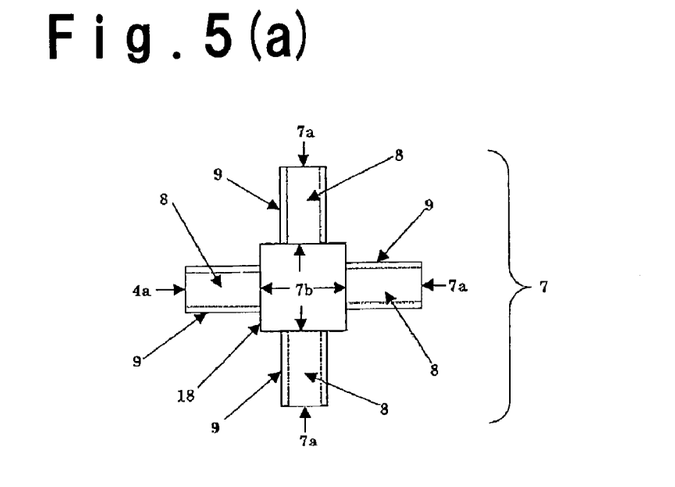
FIGS. 5(a), 5(b) and 5(c) are schematic views of the catalytic structure according to an other embodiment of the present invention.
Figure 5B:
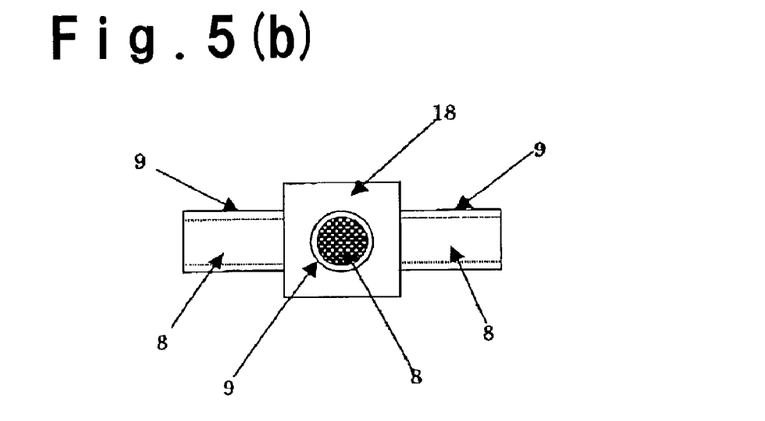
Figure 5C:
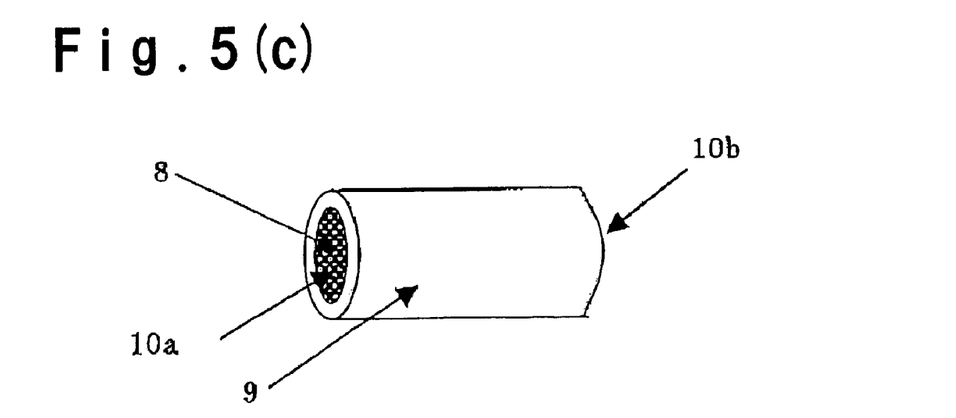
Figure 6A:
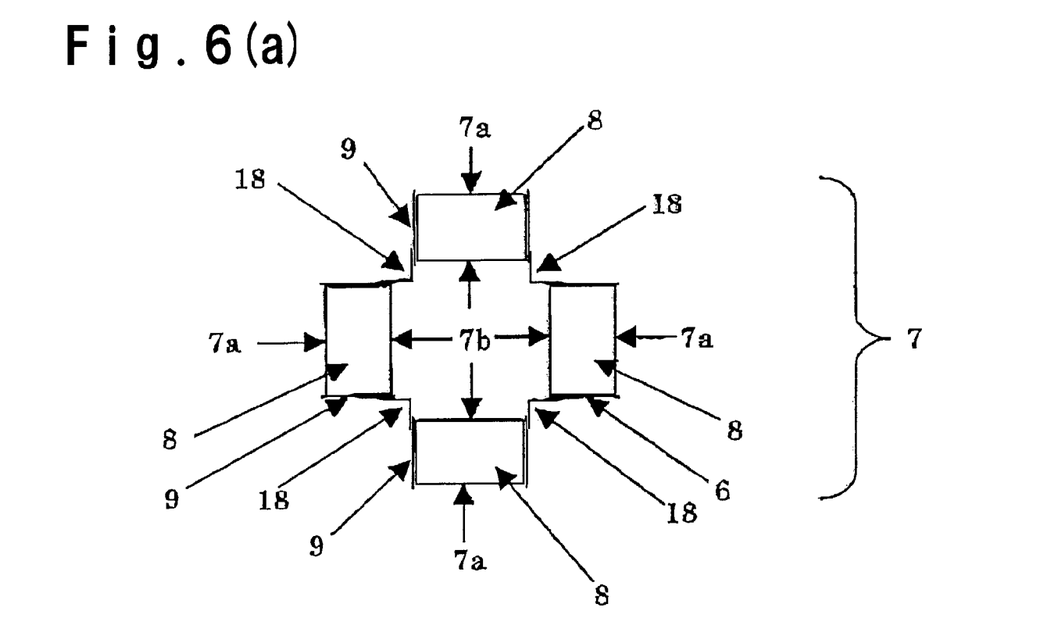
FIGS. 6(a) and 6(b) are schematic views of the catalytic structure according to an other embodiment of the present invention.
Figure 6B:
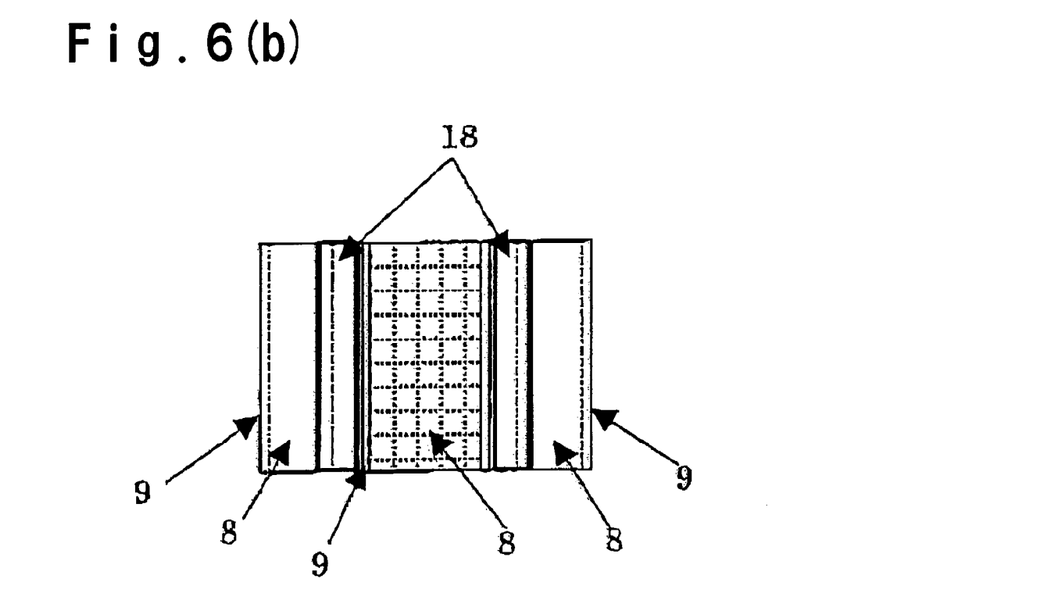

The catalytic structure 7 according to the present invention may comprise four catalytic members 8, each of which has two openings, or first and second openings, working, respectively, as the inflow surface 7a for the fluid to be subjected to combustion reaction and the outflow surface 7b for the fluid after combustion reaction. One of the first and second openings of each of the catalytic members is provided so as to be located at a lateral side of a rectangular parallelepiped. When explanation is made about a case wherein the outflow surfaces of the catalytic members inwardly face each other in the catalytic structure, the outflow surfaces 7b of the four catalytic members are located on respective sides of a square as viewed from the top of the catalytic members, and the outflow surfaces 7b of the respective catalytic members for the fluid after combustion reaction are coupled with seal members 18. The catalytic structure thus constructed is applicable to the catalytic combustion reactor.

There is no limitation to the shape of the catalytic members. The catalytic members may be formed in any shapes, such as a rectangular parallelepiped shape (see reference numeral 8 in FIG. 3a to FIG. 4c, and FIGS. 6a and 6b), or a cylindrical shape (see reference numeral 8 in FIGS. 5a to 5c). It is preferable in terms of easy design of the reactor and reaction effectiveness that the catalytic members are formed in a rectangular parallelepiped shape.

The first openings or the second openings may be coupled by seal members. Any coupling methods are applicable as long as it is possible to cover gaps between adjacent openings so as to prevent a fluid from leaking out because of, e.g., formation of a shortcut. The coupling may be made by a method wherein adjacent openings are coupled by use of a combination of a heat-resistant adhesive and a heat-resistant and/or corrosion-resistant metallic material, or by use of a refractory material, such as a firebrick. The catalytic structure may have a top or a bottom sealed by a seal member or the like. When it is necessary to increase the reaction area, the catalytic members may be formed as one-unit (see reference numeral 11 in FIGS. 4(a) and 4(b)).

The seal member may be made of any material as long as it is possible to couple adjacent first openings or adjacent second openings of the respective catalytic members. For example, a metallic plate made of an Fe-based alloy containing high Ni and high Cr, a Ni-based heat-resistant and corrosion-resistant alloy containing Cr or the like, a refractory material, such as a firebrick, a heat-insulating material covering a gap between a catalytic member and a metallic plate (such as, calcium silicate, asbestos or heat-resistant fiber made of silica-alumina), or a heat-resistant adhesive is applicable. The fluid shielding effect offered by the seal members can avoid a possibility that the members forming the reactor is exposed to a fluid having a high temperature or having high temperature and a corrosive property.

Normally, the outer surface of each of the catalytic members except for the inflow surface for the fluid before catalytic combustion and the outflow surface for the fluid after catalytic combustion is sealed by the seal member. The seal member is thermally insulated by a heat-insulating material to prevent the reaction temperature of the catalytic bed from lowering. The seal member can prevent the catalyst at a high temperature from touching the members forming the reactor. Although the first openings and the second openings (the coupled openings and the uncoupled openings) of the catalytic members may work as outflow surface portions for the fluid after catalytic combustion or inflow surface portions for the fluid before catalytic combustion, it is preferable that the coupled openings work as the outflow surface portions, i.e., that the outflow surfaces of the catalytic members face inwardly. This is because it is necessary to minimize a possibility that the members forming the reactor is exposed to the treated fluid having a high temperature or having a high temperature and a corrosive property.

Each of the catalytic members according to the present invention may comprise a catalyst and a carrier therefor.

There is no limitation to the catalyst used in the catalytic members according to the present invention as stated earlier. There is no limitation to the shape of the catalyst. The catalyst may be formed in any known shape, such as a honeycomb shape, a granular shape, a pellet shape, a spherical shape, a tablet shape, an extrusion shape, a compacted strand shape, a hollow strand shape, or a saddle shape. The catalyst may be finally filled into the carrier stated later. Each of the catalytic members may be formed into a single unit by combining a plurality of honeycomb shaped catalysts. Incorporation of the active component of the catalyst may be carried out after the catalyst has been formed in a specific shape. The catalyst may be subjected to a pretreatment, such as drying or baking.

The catalytic structure may be formed in such a shape that the catalyst of each of the catalytic members can be held by locating the first opening or the second openings so as to form lateral sides of a rectangular parallelepiped, and that the inflow surface for the fluid to be subjected to combustion reaction and the outflow surface for the fluid after combustion reaction can be independently ensured in each of the catalytic members. There is no limitation to the shape of the catalytic structure as long as it is possible to avoid a significant change during reaction. For example, a metallic frame having inflow portions for the fluid to be subjected to combustion reaction and outflow portions for the fluid after combustion reaction (see reference numeral 9 shown in FIGS. 3(*a*) to 3(*c*)), a frame with metallic nets (see reference numeral 9 shown in FIGS. 4(*a*) to 4(*c*)) and a metallic cylindrical member (see reference numeral 9 shown in FIGS. 5(*a*) to 5(*c*)) are applicable. In a case wherein it is preferable to decrease the pressure loss that is created when the fluid to be subjected to combustion reaction passes through the catalytic structure, it is particularly effective to use a honeycomb catalyst wherein a catalyst is carried on a honeycomb body made of ceramics or the like. Each of the catalytic members may be formed into a single unit by combining a plurality of honeycomb shaped catalysts. Incorporation of the active component of the catalyst may be carried out after the catalyst has been formed in a specific shape. The catalyst may be subjected to a pretreatment, such as drying or baking.

When the catalytic structure comprises the catalytic members divided into 4 pieces, it is advantageous that the reactor can be made compact, and that the creation of inadvertent channeling of the fluid to be subjected to combustion reaction passing through the catalytic bed can be extremely minimized, and further that the fluid to be subjected to combustion reaction can be equally passed through the entire catalytic members to equally increase catalytic efficiency with a low pressure loss.

The catalytic combustion reaction method using the catalytic combustion reactor or the catalytic structure according to the present invention is applicable to the oxidation reaction of hydrocarbon or halogenated hydrocarbon, or various sorts of known catalytic reaction using, e.g., an oxidation catalyst for carbon monoxide. From the viewpoint that the catalytic combustion reaction method offers an advantage to minimize the contact of the members forming the reactor with a treated fluid having a high temperature or having a high temperature and a corrosive property, the catalytic combustion reaction method is usefully applicable to exothermic reaction, in particular to the oxidation reaction of hydrocarbon and/or halogenated hydrocarbon. With respect to hydrocarbon, the catalytic combustion reaction method is applicable to the oxidation reaction of unsaturated hydrocarbon, such as ethylene, saturated hydrocarbon, such as ethane, and aromatic hydrocarbon, such as benzene. With respect to halogenated hydrocarbon, the catalytic combustion reactor and the catalytic combustion reaction method are preferably applicable to the oxidation reaction of chlorinated hydrocarbon, in particular, ethane dichloride, ethyl chloride, vinyl chloride monomer or chlorobenzene.

The reaction is completed by a process wherein the fluid to be subjected to combustion reaction, which has been prepared so as to have a certain temperature required for the start of reaction, is passed through the catalytic structure, i.e., the inflow surface of each of the catalytic members, and the fluid after combustion reaction is discharged from the outflow surface of each of the catalytic members. Although there is no limitation to the temperature required for the start of reaction, it is preferable to set the temperature at 100 to 700° C. Although there is no limitation to the space velocity of a gas, it is preferable to set the space velocity at 100 to 500,000 $hr^{-1}$.

The temperatures of the inflow surface of each of the catalytic members, the catalytic bed and the outflow surface of each of the catalytic members are normally measured by thermocouples in terms of process control.

Now, the present invention will be described in more detail in reference to an example of the present invention. The present invention is not limited to the example.

EXAMPLE

Ethylene and ethane dichloride (hereinbelow, referred to as EDC) were subjected to oxidation reaction, using the catalytic structure and the reactor as shown in FIGS. 1(*a*) and 1(*b*). Each of the catalytic members 8 was a rectangular honeycomb shaped catalyst, which had a width of 1,000 mm, a depth of 500 mm and a height of 3,000 mm, which had a cell number: 350 cpsi, a catalytic component: an alumina carrier carrying Pt (1%) and a coating amount: 180 g/l. The catalytic structure 7 was provided by coupling the inflow surfaces 7*b* the four catalytic members 8 by use of seal members (material: an Ni-based alloy containing Cr). The reaction was carried out in such a way that a 25500 $Nm^3/H$ of fluid to be subjected to combustion reaction, which contained ethylene: 4400 vol.ppm, EDC: 2750 vol.ppm, oxygen: 11.3 vol %, and nitrogen: balance, was supplied outside of the heat exchange tube in the heat exchanger. The gas temperature at that time was 150° C. The flows of the fluid to be subjected to combustion reaction and the fluid after combustion reaction were as shown in FIG. 2.

The gas chromatography analyses of the ethylene and the EDC in the fluid after combustion reaction, which was discharged outside the reactor, showed that both ethylene and EDC were less than 1 vol.ppm. By the combustion reaction, 1 mol of EDC generated 2 mol of hydrogen chloride, which had a corrosive property.

The temperature of the fluid to be subjected to combustion reaction, which entered the catalytic structure, was 350° C., the temperature of the fluid after combustion reaction, which just flowed out of the catalytic structure, was 650° C., and the temperature of the fluid after combustion reaction, which was discharged outside of the reactor, was 470° C. Each of the four catalytic members had an equal temperature distribution therein. This means that the treated fluid equally passed through the catalytic members without creating channeling.

The catalytic combustion reactor had the main body made of stainless steel and was exposed to a corrosive atmosphere containing by hydrogen chloride at 650° C. The connection portion 12 in the reactor was made of an Ni-based heat-resistant and corrosion-resistant alloy containing Cr and had a surface area of 2 $m^3$.

The portion that was exposed to a high temperature atmosphere was limited to an extremely limited area in the catalytic combustion reactor 1. The temperature of the inner wall of the reactor, where the outermost portion of the reactor 1 exposed to the fluid to be subjected to combustion reaction, were 350° C., which means that the thermal insulation of calcium silicate having a thickness of 175 mm, which was required to prevent heat radiation from the outermost portion, was able to decrease the amount of thermal energy loss due to heat radiation to 0.3% of the heat quantity of the combustion reaction.

There was almost no need for use of a quality material in the outermost portion of the reactor 1 for ensuring the strength required to avoid breakage caused by a pressure difference between the inner and outer portions of the reactors, avoiding damage under high temperature atmosphere, or another purpose.

COMPARATIVE EXAMPLE

Figure 7:
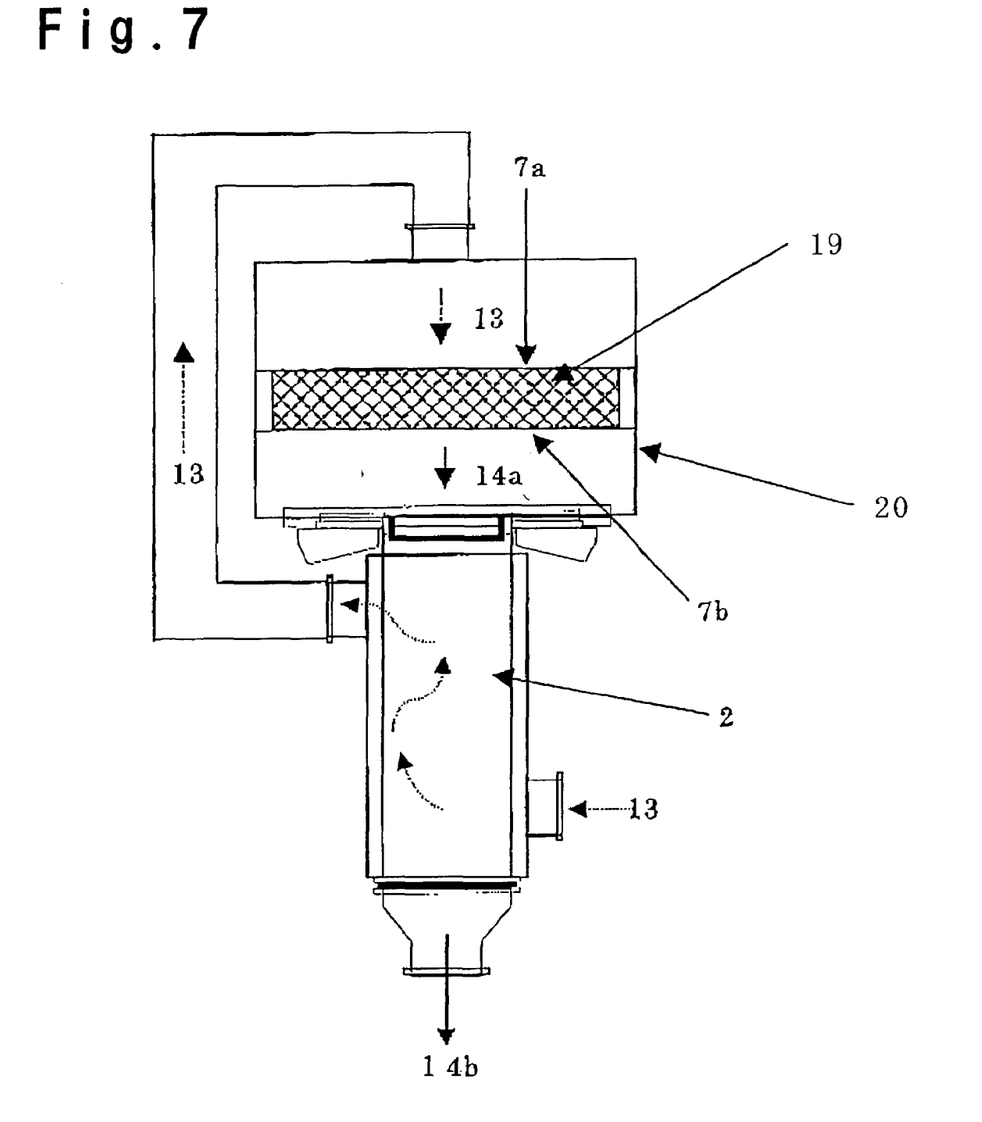
FIG. 7 is a schematic view of a comparative example.

Four catalytic members that were prepared in the same way as the catalytic members in Example were coupled to form a rectangular catalytic structure 19 with a flow path for a fluid to be treated having a length of 500 mm as shown in FIG. 7. When the catalytic structure was subjected to the same reaction as Example, the temperature of the inflow surface 7a of the catalytic structure, i.e., the temperature of the inner wall of the reactor, was 300° C., the temperature of the outflow surface 7b of the catalytic structure was 650° C., and the temperature of the outlet of the heat exchanger 2 was 470° C.

A portion of the reactor 20 that was made of a Ni-based heat-resistant and corrosion-resistant alloy containing Cr and was exposed to a high temperature atmosphere had a surface area of 12 $m^2$ or greater.

A majority portion of the system was occupied by the outermost portion of the reactor 20, which 11 $m^2$. As a result, the reactor required for special consideration with respect to a decrease in the amount of thermal energy loss due to heat radiation, and the damage and the strength of the outermost portion of the reactor 20.

Thus, the present invention can provide a catalytic combustion reactor, which is configured to have a catalyst housed therein, to generate catalytic combustion reaction therein, to minimize heat radiation loss to outside when recovering the thermal energy from the combustion generated by the catalytic combustion reaction, and to minimize the area of the outermost portion in contact with a fluid after combustion reaction to extremely decrease the necessary amount of a quality material having a heat-resistant and corrosive-resistant property, and a method for carrying out the catalytic combustion reaction by use of the catalytic combustion reactor.

The entire disclosures of Japanese Patent Application No. 2002-95049 filed on Mar. 29, 2002 and Japanese Patent Application No. 2002-95048 filed on Mar. 29, 2003 including specifications, claims, drawings and summaries are incorporated herein by reference in their entireties.

What is claimed is:

1. A catalytic combustion reactor system, comprising:
a heat exchange unit that comprises a bundle of open-ended tubes, the bundle having first and second collective ends, the first collective end adjoining a catalytic reactor that comprises a plurality of catalyst containing housings each of which is provided with an opening for the inflow of fluid for combustion and an opening for the outflow of fluid combustion product;
an outer shell that envelopes the adjoined heat exchange unit and catalytic reactor and permits the flow of fluid to contact the heat exchange tube surfaces to absorb heat generated by the combustion reaction and to enter the inlet openings of the catalyst containing housings, the shell having a single fluid inlet in the area of the second collective end of the heat exchange unit, thereby allowing contact of the entire length of the tubes of said bundle with the incoming fluid for the exchange of heat; and
a single outlet at said second collective end of the heat exchange unit which collects combustion fluid that is discharged from the outlet of said fluid combustion product and which traverses the length of each heat exchange tube;
wherein the catalyst reactor comprises four catalyst containing housings, each in the form of a rectangular parallelepiped and each of which is provided with an inflow opening for fluid to be combusted and an outflow opening for fluid combustion product, wherein one of said openings of each of the catalyst housings is provided on a lateral side of the rectangular parallelepiped structure.

2. The reactor system according to claim 1, wherein the bundle of tubes and the catalytic reactor are independently firmly supported by support members, and wherein at the point of adjoinder of the heat exchange unit and the catalytic reactor, a connection portion is positioned which is detachable.

* * * * *